(12) United States Patent
Cursoux et al.

(10) Patent No.: US 9,226,613 B2
(45) Date of Patent: Jan. 5, 2016

(54) GAS BARBECUE

(75) Inventors: Bruno Cursoux, Mornant (FR); Didier Tabonet, Oullins (FR)

(73) Assignee: Application Des Gaz, Saint Genis Laval (FR)

( * ) Notice: Subject to any disclaimer, the term of this patent is extended or adjusted under 35 U.S.C. 154(b) by 571 days.

(21) Appl. No.: 13/516,116

(22) PCT Filed: Nov. 25, 2010

(86) PCT No.: PCT/FR2010/052539
§ 371 (c)(1),
(2), (4) Date: May 7, 2013

(87) PCT Pub. No.: WO2011/089326
PCT Pub. Date: Jul. 28, 2011

(65) Prior Publication Data
US 2014/0360386 A1 Dec. 11, 2014

(30) Foreign Application Priority Data
Dec. 16, 2009 (FR) .................... 09 59050

(51) Int. Cl.
A47J 37/00 (2006.01)
A47J 37/07 (2006.01)
A47J 37/06 (2006.01)

(52) U.S. Cl.
CPC .......... *A47J 37/0713* (2013.01); *A47J 37/0682* (2013.01); *A47J 37/0704* (2013.01); *A47J 37/0786* (2013.01)

(58) Field of Classification Search
CPC . A47J 37/0704; A47J 37/0713; A47J 37/067; A47J 37/0682

USPC .......... 99/450, 445, 447, 401, 400; 126/25 R, 126/41 R
See application file for complete search history.

(56) References Cited

U.S. PATENT DOCUMENTS

| 2,253,834 | A | * | 8/1941 | Herbert | 99/446 |
| 4,403,597 | A | | 9/1983 | Miller | |
| 7,073,429 | B2 | * | 7/2006 | Bruno et al. | 99/400 |
| 7,640,929 | B2 | * | 1/2010 | Johnson et al. | 126/41 R |
| 2004/0173200 | A1 | * | 9/2004 | Shoeb | 126/41 R |
| 2004/0216621 | A1 | | 11/2004 | Schlosser et al. | |
| 2009/0272278 | A1 | * | 11/2009 | von Herrmann et al. | 99/450 |

FOREIGN PATENT DOCUMENTS

EP 1447035 8/2004
EP 1870006 12/2007

OTHER PUBLICATIONS

International Search Report.

* cited by examiner

*Primary Examiner* — Reginald L Alexander

(57) ABSTRACT

The present invention relates to a gas barbeque comprising: a cooking tank or pit; a burner (20) contained in the tank and including a set of openings for ejecting gas to be burned; and a cooking grill (21) that is placed through an opening located above the tank. Said gas barbeque is characterized in that the cooking grill (21) comprises solid portions. The gas ejection openings are placed underneath the solid portions of the grill and are oriented upward toward the solid portions of the cooking grill (21), and the distance between the gas ejection openings of the burner (20) and the cooking grill (21) is between 10 mm and 35 mm.

8 Claims, 3 Drawing Sheets

GAS BARBECUE

CROSS-REFERENCES TO RELATED APPLICATIONS

The present application is a U.S. National Phase Application under 35 U.S.C. §371 of International Application No. PCT/FR2010/052539, filed on Nov. 25, 2010, which claims priority to French Application No. FR 09/59050, filed on Dec. 16, 2009, the benefit of the filing date of which is hereby claimed and each of which are incorporated herein in their entirety by reference.

The present invention relates to a gas barbecue.

In a known manner, a gas barbecue includes a cooking tank or pit, a burner contained in the tank and including a set of openings for ejecting gas to be burned, and a cooking grill that is placed through an opening located above the tank. The cooking grill is intended to serve as a support for the food to be grilled.

An intermediate element is positioned between the burner and the grill, said intermediate element in particular being able to consist of a layer of lava rock or a metal element having openings, so as to prevent flames from rising due to grease falling from the cooking grill onto the burner.

Document U.S. Pat. No. 4,403,597 describes one such barbecue.

The known devices create a significant gas consumption, which it is desirable to reduce while preserving a satisfactory cooking temperature at the grill.

The present invention aims to resolve all or some of the aforementioned drawbacks.

To that end, the present invention relates to a gas barbecue including a cooking tank or pit, a burner contained in the tank and including a set of openings for ejecting gas to be burned, and a cooking grill that is placed through an opening located above the tank, wherein in that the cooking grill comprises solid portions, the gas ejection openings are placed underneath the solid portions of the cooking grill and are oriented upward toward the solid portions of the cooking grill, and the distance between the gas ejection openings of the burner and the cooking grill is between 10 mm and 35 mm.

The proximity of the burner and the cooking grill as well as the orientation of the gas ejection openings relative to the cooking grill make it possible to decrease heat losses by directly heating the cooking grill at a small distance with a lower heating power, resulting in smaller flames formed from the openings for the ejection of the gas from the gas burner, for a same cooking temperature relative to the state of the art. The gas consumption is thereby decreased.

The solid portions provided above the burners prevent the grease forming drops falling from the edge of said solid portions from coming into contact with the gas ejection openings. The grease falls directly into the bottom of the vat, for example inside a removable tray provided to that end.

In this way, the risk of the grease igniting is reduced, and the wear of the burner and plugging of the gas ejection openings are decreased.

According to one embodiment, the distance between the gas ejection openings of the burner and the cooking grill is between 10 mm and 30 mm.

According to the same embodiment, the distance between the gas ejection openings of the burner and the cooking grill is between 15 mm and 25 mm.

According to one embodiment, the gas ejection openings are arranged so that the maximum distance between a point of the cooking grill and a vertical axis passing through a gas ejection opening is smaller than 100 mm, and advantageously smaller than 70 mm.

This measure makes it possible to obtain good heat distribution over the entire cooking grill.

According to one embodiment, the surface area of the gas openings is sized so as to diffuse a gas flow rate below 0.30 $g/cm^2/h$ of cooking grill surface area, advantageously below 0.25 $g/cm^2/h$ and preferably below 0.2 $g/cm^2/h$.

According to one embodiment, the depth between the bottom of the tank and the cooking grill is between 100 and 150 mm, and preferably comprised between 110 and 125 mm.

This measure makes it possible to manufacture shorter barbecues, because the distance between the bottom of the vat that collects the grease and the burner can be reduced without risk of igniting the grease, given the lower power of the burners. In this way, it is possible to decrease the bulk of the barbecue heightwise and therefore reduce the manufacturing costs related to the quantity of material used.

According to one embodiment, the burner is arranged completely below the solid portions of the cooking grill.

This measure makes it possible to protect the entire burner from falling grease.

In any event, the invention will be well understood using the following description, and in reference to the appended drawings, showing, as a non-limiting example, one embodiment of this gas barbecue.

Figure 1:
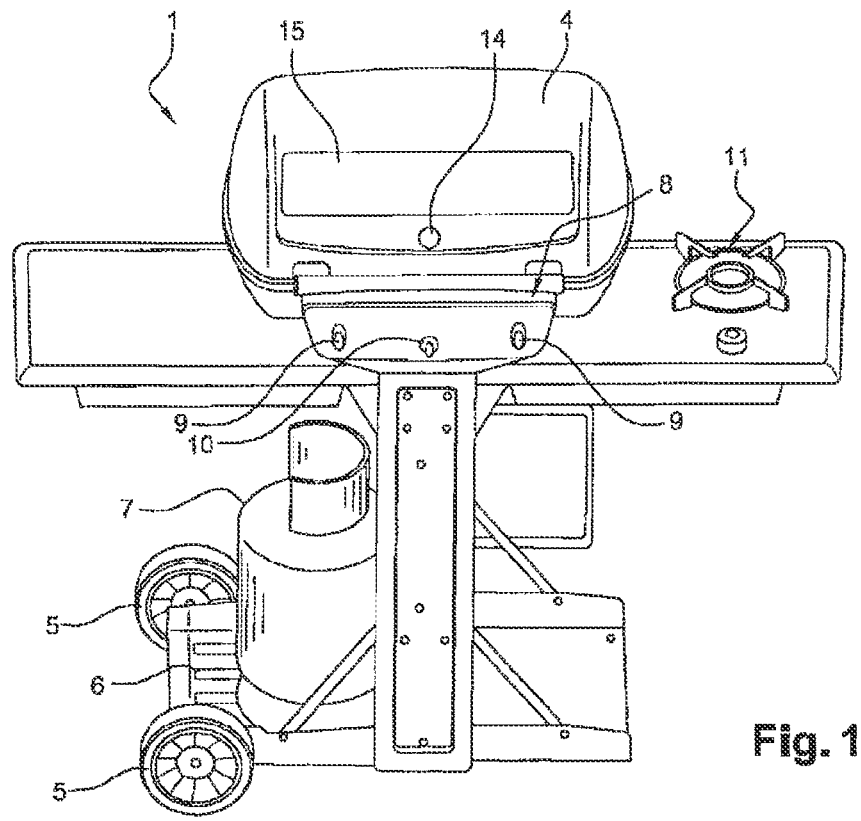
FIG. 1 is a general view of the gas barbecue.
Figure 2:
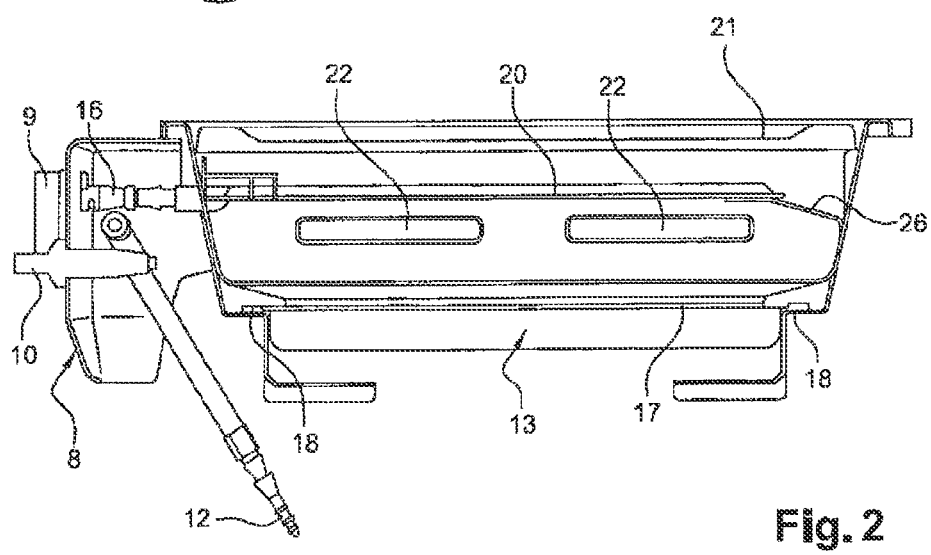
FIG. 2 is a lateral cross-section of the vats of the barbecue of FIG. 1.
Figure 3:
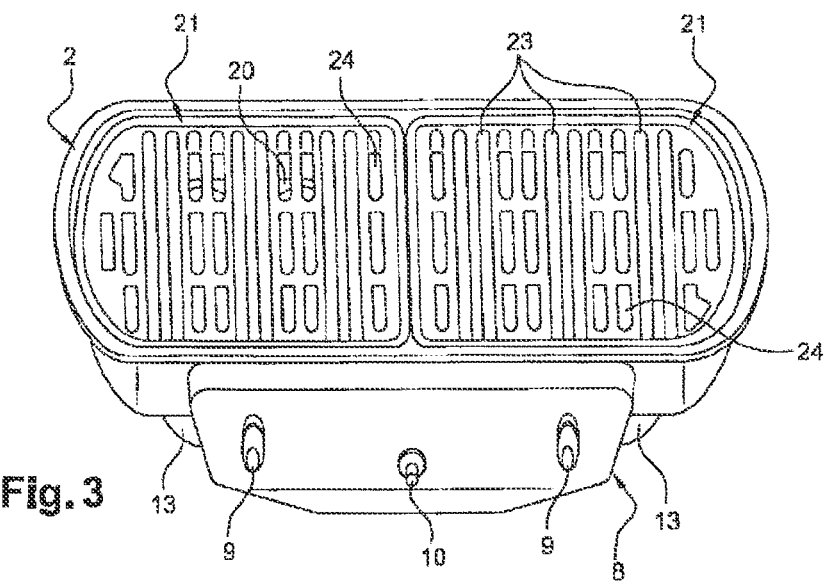
FIG. 3 shows a top view of the vats of the barbecue of FIG. 1.

As illustrated in FIG. 1, a barbecue 1 according to one embodiment of the invention comprises a vat 2 topped by a cover 4, both positioned on a wagon 3 equipped with wheels 5 making it possible to move the barbecue 1.

On the wagon 3, there is a location 6 for a gas bottle 7, the gas generally being butane or propane.

Next to the vat 2, there is an additional offboard burner 11, of the type equipping a traditional gas cooker, so as to increase the cooking possibilities of the barbecue 1.

The vats 2 is secured on the plate of the wagon 3 and includes, on its front surface, a control panel 8 including knobs 9 for adjusting the gas flow rate and an ignition knob 10 of the piezoelectric type.

The vat 2 is generally parallelepiped with curved lateral eddies along the two widths of the rhomb, straight lateral edges along the two long sides of the rhomb, and an open upper surface. The bottom of the vat is then cut out, thereby forming a hollow bottom.

The open surface of the vat 2 is covered by the cover 4 rotatably mounted around hinges (not shown) making it possible to open the vat 2 by its front surface. The cover 4 has, on its front surface, a transparent portion 15, which may for example be made from glass of the Pyrex® type, making it possible to see the inside of the vat 2 when the cover 4 is in the closed position. The cover 4 also has a temperature indicator 14 on its front surface.

As illustrated in FIGS. 2 to 6, the vat 2 of the barbecue 1 according to the aforementioned embodiment comprises two adjacent burners 20 connected to a channel 16 comprising a connecting tip 12 for a hose (not shown) intended to be connected to an expansion valve (not shown) connected to the gas bottle 7.

The channel 16 is provided stationary inside the control panel 8 and rotating the adjustment knobs 9 makes it possible to open or close the passage in that channel 16, and therefore adjust the gas flow rate inside each of the burners 20.

The bottom of the vat 2 comprises two openings each emerging in a grease recovery tray 13 comprising a lateral circumferential lip allowing it to slide freely on rails secured to the bottom of the vat 2.

In order to achieve good combustion, the air intakes 22 are also formed on the lateral walls of the vat 2.

Figure 4:
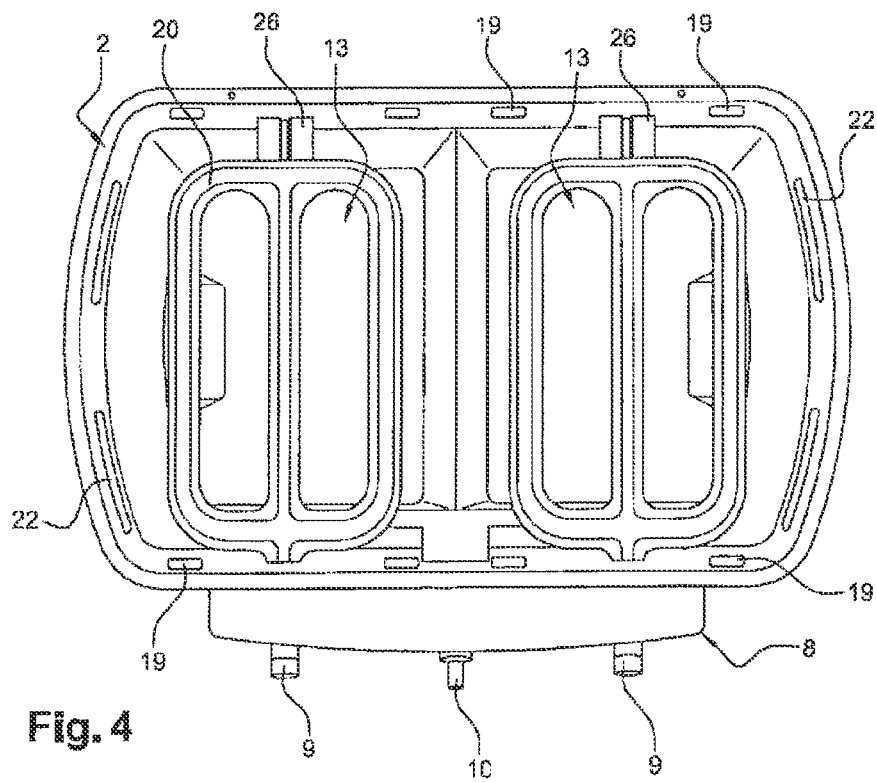
FIG. 4 shows a top view of the inside of the vats of the barbecue of FIG. 1.
Figure 5:
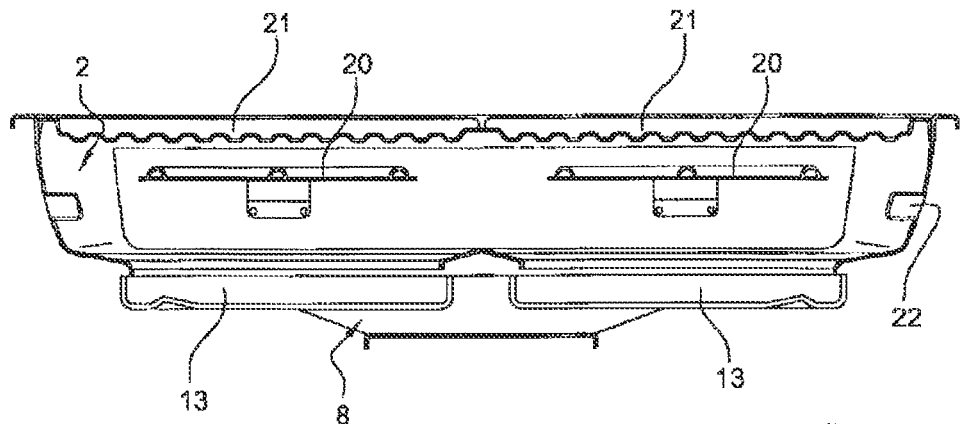
FIG. 5 shows a front longitudinal cross-sectional view of the vats of the barbecue of FIG. 1.

As shown in FIG. 4, each burner 20 includes a wall delimiting an inner gas passage conduit.

The wall of each burner 20 comprises multiple gas ejection openings 25 oriented vertically toward the upper opening of the vat 2.

The wall is formed by an upper form comprising a curved portion attached on a lower form that is also curved, the two forms being attached by their respective edges. The openings 25 are formed in a curved portion of the upper form.

Each burner 20 thus defines a path for the passage of gas forming a rectangle with rounded corners having a connecting branch between the middles of the two widths of the rectangle.

A support tab 26 of the burner extends between the connecting branch between the middles of the two widths of the rectangle and the inner surface of the vat 2. The burner also bears on the channel 16.

The vat 2 is closed by a grill 21 made up of two adjacent portions, the side-by-side arrangement of which assumes the form of the contour of the upper opening of the vat 2.

The grill portions 21 are simply placed along a plane on the shoulders 19 formed on the inner surface of the vat 2 and laterally maintained by the portion of the inner surface of the vat 2 situated above the shoulders 19.

These two grills 21 have solid portions 23 positioned above the conduits forming the lengths and widths of the rectangular shape of the two burners, as well as the conduit joining the two widths of the rectangle over the middle thereof.

Figure 6:
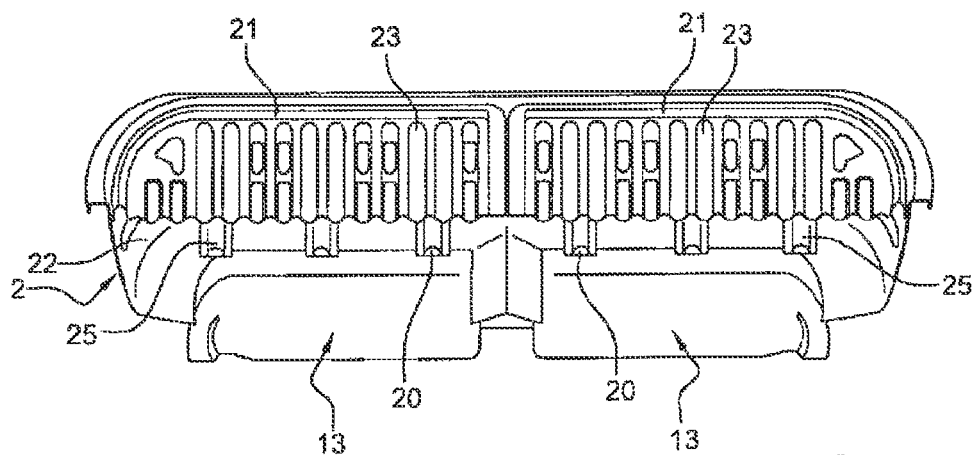
FIG. 6 shows a top perspective longitudinal cross-sectional view of the vats of the barbecue of FIG. 1.

As shown in FIG. 6, these solid portions 23 of the two cooking grills 21 have a corrugated section.

The other portions of the grills 23 are formed by oblong passages 24.

The gas ejection openings 25 of the burners 20 are oriented toward the solid portions 23 of the grills 21 such that the point of the cooking grill 21 furthest from the vertical of a gas ejection opening is 70 mm.

The width of these solid portions 23, as well as the contour of the grills 21, makes it possible to cover the burners 20 completely when the vat 2 is seen from above.

The vertical distance between a burner 20 and the cooking grill 21 covering it is in the vicinity of 18 mm in the example shown in the drawing.

When the barbecue 1 according to the invention is used, the user starts by opening the gas bottle 7, then turning the adjustment knob 9 for adjusting the gas flow rate circulating inside the burner 20 that he wishes to light. It is understood that to light both burners 20, the user will turn the second flow rate adjustment knob 9.

The gas then escapes through the plurality of gas ejection openings 25 arranged on the burners 20.

For ignition, the user need only press on the piezoelectric lighting knob 10 in order to create a spark causing combustion of the gas.

Flames then spread closer and closer until all of the gas escaping through the gas ejection openings 25 of the burner 20 is ignited.

These obtained flames are small, given the small section of the gas ejection openings 25.

The solid portions 23 of the grills 21 have a corrugated section.

Part of the heat escapes through the oblong passages 24 arranged on the grills 21, and in general, the heat is distributed uniformly on the grills 21 by heat conduction and convection.

In this way, the food is cooked uniformly, irrespective of its location on the surface of the grills 21, with reduced gas consumption.

The grease from this food flows through the oblong passages 24 provided on the grills 21, and possibly the interface between the grills 21, without flowing onto the burners 20, which are hidden by the solid portions 23 of the grills 21, which reduces the risks of ignition of the grease, but also extends the lifetime and time between cleanings of the barbecue 1.

This grease drips from the cooking grills 21 to the grease recovery trays 13, from which it can be discharged after using the barbecue 1.

Due to the technical features described above, according to one embodiment of a barbecue 1 according to the invention, the gas consumption per hour as a function of the cooking grill surface area is less than $0.2 \text{ g/cm}^2/\text{h}$, the power supplied per hour of operation of the cooking grill surface area is less than $2.8 \text{ W/cm}^2/\text{h}$, the gas consumption per hour of operation of the outlet section of the burner is less than $0.22 \text{ g/mm}^2/\text{h}$, and the power supplied per hour of operation of the output section of the burner is less than $3 \text{ W/mm}^2/\text{h}$.

In this way, the gas consumption can be reduced to nearly 50% relative to a barbecue of the state of the art.

Although the invention has been described relative to one particular embodiment, it is of course in no way limited thereto and encompasses all technical equivalents of the means described, as well as combinations thereof, if they are within the scope of the invention.

Thus, the burners 20 and the grills 21 may assume several forms without going beyond the scope of the invention.

The invention claimed is:

1. A gas barbecue, comprising:
   a cooking tank;
   a burner contained in the tank and including a set of openings for ejecting gas to be burned; and
   a cooking grill that is placed through an opening located above the tank,
   wherein:
   the cooking grill comprises a corrugated surface including a plurality of peaks and valleys, the plurality of valleys comprising alternating groups of valleys comprising solid portions, and groups of valleys comprising open portions, wherein the solid portions substantially span a width of the cooking grill;
   the burner is aligned widthwise under the cooking grill;
   each of the gas ejection openings in the set is positioned underneath one of the solid portions of the cooking grill and is oriented upward toward the one of the solid portions of the cooking grill; and
   the distance between the gas ejection openings of the burner and the cooking grill is between 10 mm and 35 mm.

2. The gas barbecue of claim 1, wherein the distance between the gas ejection openings of the burner and the cooking grill is between 10 mm and 30 mm.

3. The gas barbecue of claim 2, wherein the distance between the gas ejection openings of the burner and the cooking grill is between 15 mm and 25 mm.

4. The gas barbecue of claim 1, wherein the gas ejection openings are arranged so that the maximum distance between a point of the cooking grill and a vertical axis passing through a gas ejection opening is smaller than 100 mm.

5. The gas barbecue of claim 4, wherein the maximum distance between a point of the cooking grill and a vertical axis passing through a gas ejection opening is smaller than 70 mm.

6. The gas barbecue of claim 1, wherein the surface area of the gas openings is sized so as to diffuse a gas flow rate below 0.30 g/cm2/h of cooking grill surface area.

7. The gas barbecue of claim 1, wherein the depth between the bottom of the tank and the cooking grill is between 100 and 150 mm.

8. The gas barbecue of claim 1, wherein the burner is arranged completely below the solid portions of the cooking grill.

\* \* \* \* \*